US012623508B2

(12) United States Patent
Byun et al.

(10) Patent No.: US 12,623,508 B2
(45) Date of Patent: May 12, 2026

(54) FUEL CELL VEHICLE

(71) Applicants: Hyundai Motor Company, Seoul (KR); Kia Corporation, Seoul (KR)

(72) Inventors: Hyung Suk Byun, Hwaseong-Si (KR); Dong Keon Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 234 days.

(21) Appl. No.: 18/521,952

(22) Filed: Nov. 28, 2023

(65) Prior Publication Data

US 2024/0294050 A1 Sep. 5, 2024

(30) Foreign Application Priority Data

Mar. 2, 2023 (KR) ........................ 10-2023-0027769

(51) Int. Cl.
*B60H 1/00* (2006.01)
*B60H 1/32* (2006.01)
(52) U.S. Cl.
CPC ..... *B60H 1/00385* (2013.01); *B60H 1/00485* (2013.01); *B60H 1/00821* (2013.01); *B60H 1/3202* (2013.01)
(58) Field of Classification Search
CPC . B60H 1/00385; B60H 1/32331; Y02E 60/50; Y02T 90/40; H01M 8/04052
See application file for complete search history.

(56) References Cited

U.S. PATENT DOCUMENTS

| | | | | | |
|---|---|---|---|---|---|
| 4,494,384 | A | * | 1/1985 | Lott | .......................... F01P 9/02 |
| | | | | | 62/506 |
| 11,398,637 | B2 | * | 7/2022 | Wakatsuki | ........ H01M 8/04037 |
| 11,527,768 | B2 | * | 12/2022 | Rovik | ............... H01M 8/04723 |
| 2002/0184901 | A1 | * | 12/2002 | Ishikawa | ................... F28D 5/00 |
| | | | | | 62/171 |
| 2003/0148155 | A1 | * | 8/2003 | Matthews | ......... H01M 8/04029 |
| | | | | | 429/430 |
| 2010/0307176 | A1 | * | 12/2010 | Zeweke | ............... B60H 1/3233 |
| | | | | | 62/506 |
| 2019/0316849 | A1 | | 10/2019 | Mendez Abrego et al. | |

FOREIGN PATENT DOCUMENTS

| | | |
|---|---|---|
| JP | 2017-128197 | 7/2017 |
| JP | 2018-157460 | 10/2018 |

* cited by examiner

*Primary Examiner* — Lionel Nouketcha
(74) *Attorney, Agent, or Firm* — MORGAN, LEWIS & BOCKIUS LLP

(57) ABSTRACT

A fuel cell vehicle includes a heat source discharging cooling water, a radiator dissipating heat from the cooling water and including areas including different temperatures, a first spray unit spraying a first spray liquid to an area including a high temperature among the areas, a second spray unit spraying a second spray liquid including a lower temperature than the first spray liquid to an area including a low temperature among the areas, a first valve connected to the storage unit and the first spray unit and configured to be opened or closed in response to a first control signal to supply the first spray liquid to the first spray unit, a second valve connected to the storage unit and the second spray unit and configured to be opened or closed in response to a second control signal to supply the second spray liquid to the second spray unit, and a controller configured for generating the first and second control signals to control the spray amount of the spray liquids and spraying operation.

19 Claims, 9 Drawing Sheets

170A

140A

140B

FUEL CELL VEHICLE

CROSS-REFERENCE TO RELATED APPLICATION

The present application claims priority to Korean Patent Application No. 10-2023-0027769, filed on Mar. 2, 2023, the entire contents of which is incorporated herein for all purposes by this reference.

BACKGROUND OF THE PRESENT DISCLOSURE

Field of the Present Disclosure

The present disclosure relates to a fuel cell vehicle.

Description of Related Art

To cope with climate change, eco-friendly vehicles for reduction of carbon emissions have been actively developed around the world. Because most large trucks travel a long distance and require high output, diesel engines are generally mounted in large trucks. Such a diesel engine generates emissions, such as NOx, PM, and carbon dioxide, during fuel combustion, which accelerates global warming. To reduce carbon emissions caused by these driving characteristics of trucks, research on eco-friendly vehicles using hydrogen is being actively conducted around the world.

A fuel cell electric vehicle (FCEV) (hereinafter referred to as a "fuel cell vehicle") is a vehicle that uses electrical energy generated through a chemical reaction between hydrogen and oxygen as an energy source. In the case of a fuel cell vehicle, no carbon emissions are produced, and the fuel may be easily stored and moved. In addition, a fuel cell vehicle has a shorter charging time and a longer range than other types of eco-friendly vehicles. For these reasons, hydrogen is suitable as a fuel for large trucks. However, a fuel cell vehicle having the above advantages has problems to be solved.

FIG. 1A is a graph showing comparison between management temperatures required by an internal combustion engine C1 and a fuel cell C2, and FIG. 1B is a graph showing comparison between cooling requirements of the internal combustion engine C1 and the fuel cell C2.

Referring to FIG. 1A, the temperature of the internal combustion engine C1 needs to be managed to fall within a range of 110° C. to 120° C., and the temperature of the fuel cell C2 needs to be managed to fall within a range of 70° C. to 80° C. A difference between the management temperature of the fuel cell C2 and an outside temperature of a vehicle is smaller than a difference between the management temperature of the internal combustion engine C1 and an outside temperature of a vehicle. Therefore, if a cooling module for use in the internal combustion engine C1 is applied to the fuel cell C2, cooling performance may be degraded. Furthermore, unlike the internal combustion engine C1, the fuel cell C2 has no exhaust system. Therefore, in the case of the fuel cell C2, about 50% of input energy is discharged as cooling heat, and accordingly, a cooling requirement is high, as shown in FIG. 1B. In consideration thereof, in the case of a fuel cell vehicle provided with the fuel cell C2, the size and the number of cooling modules for cooling a cell stack of the fuel cell are increased.

Furthermore, as a fuel cell vehicle is motorized, it is necessary to cool not only a fuel cell but also a motor, a power electric (PE) module, an automatic transmission (ATM), and a high-voltage battery. Numerically, the number of parts to be cooled in a vehicle provided with the fuel cell C2 (e.g., twenty to thirty) is about five times as large as that in a vehicle provided with the internal combustion engine C1 (e.g., four to six). In the case of a fuel cell vehicle, in which the number of parts to be cooled is relatively large, there is a limitation on the extent to which the size of a cooling module is increased due to the limited size of the fuel cell vehicle. Furthermore, considering a passenger compartment, a storage space, and a payload, the size of the space occupied by a cooling system in a fuel cell vehicle is at least three or four times as large as that in a vehicle provided with an internal combustion engine, e.g., a diesel engine. Therefore, research with the goal of maximizing cooling performance in a limited space in a fuel cell vehicle is underway.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel cell vehicle that substantially obviates one or more problems due to limitations and disadvantages of the related art.

Embodiments provide a fuel cell vehicle including excellent cooling performance and a method of cooling the same.

However, the objects to be accomplished by the exemplary embodiments are not limited to the above-mentioned objects, and other objects not mentioned herein will be clearly understood by those skilled in the art from the following description.

A fuel cell vehicle according to various exemplary embodiments of the present disclosure may include a heat source configured to discharge a cooling water used for generation of power, a radiator fluidically connected to the heat source and configured to dissipate heat from the cooling water used for cooling of the heat source to the outside and including areas including different temperatures, a first spray unit configured to spray a first spray liquid to an area having a first temperature of the different temperatures among the areas, a second spray unit configured to spray a second spray liquid including a lower temperature than the first spray liquid to an area including a second temperature, which is lower than the first temperature, among the areas, a storage unit fluidically connected to the first spray unit and the second spray unit and configured to store the first spray liquid and the second spray liquid therein, a first valve connected to the storage unit and the first spray unit and configured to be opened or closed in response to a first control signal to supply the first spray liquid stored in the storage unit to the first spray unit, a second valve connected to the storage unit and the second spray unit and configured to be opened or closed in response to a second control signal to supply the second spray liquid stored in the storage unit to the second spray unit, and a controller configured to generate the first control signal and the second control signal for control of the spray amount of the first spray liquid and the second spray liquid and operation of spraying the first spray liquid and the second spray liquid based on internal or external condition of the vehicle.

In an exemplary embodiment of the present disclosure, the fuel cell vehicle may further include an air conditioner connected to the storage unit and configured to discharge condensed water as the second spray liquid, the condensed water being moisture removed from humid air passing through an evaporator of the air conditioner, and product water as a by-product of generation of the power may be used as the first spray liquid.

In an exemplary embodiment of the present disclosure, the air conditioner may be driven using surplus regenerative power generated when the fuel cell vehicle is braked.

In an exemplary embodiment of the present disclosure, the radiator may include an inlet configured to receive the cooling water discharged from the heat source, a core configured to dissipate heat from the cooling water introduced into the inlet to the outside thereof, and an outlet configured to discharge the cooling water from which the heat has been dissipated through the core.

In an exemplary embodiment of the present disclosure, among the areas, an area located closer to the inlet than to the outlet may include a higher temperature than an area located closer to the outlet than to the inlet.

In an exemplary embodiment of the present disclosure, the storage unit may include a first storage chamber configured to store the product water therein, a second storage chamber configured to store the condensed water therein, and a partition wall disposed between the first storage chamber and the second storage chamber to block heat exchange between the first storage chamber and the second storage chamber.

In an exemplary embodiment of the present disclosure, the fuel cell vehicle may further include an air opening/closing unit attached to the front surface of the vehicle and configured to be opened or closed in response to a third control signal to allow or block introduction of outside air during travel of the vehicle. The first storage chamber may be disposed in an introduction passage of the outside air to be adjacent to the air opening/closing unit. The controller may be configured to generate the third control signal for control of allowance/blocking of introduction of the outside air and the introduction amount of the outside air based on the internal/external conditions of the vehicle.

In an exemplary embodiment of the present disclosure, the radiator may include a first radiator including a front surface facing the first spray unit and the second spray unit, a second radiator including a front surface facing the rear surface of the first radiator which is opposite to the front surface of the first radiator, and a fan facing the rear surface of the second radiator which is opposite to the front surface of the second radiator.

In an exemplary embodiment of the present disclosure, the radiator may further include two third radiators disposed between the first spray unit and the second spray unit and the first radiator and stacked one above another in a vertical direction. The first spray unit and the second spray unit may spray at least one of the first spray liquid or the second spray liquid to the two third radiators.

In an exemplary embodiment of the present disclosure, the first radiator, the second radiator, and the two third radiators may be disposed to be aligned with each other while being spaced from each other in a heading direction of the fuel cell vehicle.

In an exemplary embodiment of the present disclosure, the internal/external conditions of the vehicle may include at least one of an outside air temperature of the fuel cell vehicle, the traveling speed of the fuel cell vehicle, the rotation speed of the fan, the rotation speed of a water pump for the heat source, the temperature of the cooling water discharged from the heat source, or the load level of the heat source.

According to another exemplary embodiment of the present disclosure, a method of cooling a fuel cell vehicle including a heat source configured to discharge a cooling water used for generation of power and a radiator fluidically connected to the heat source and configured to dissipate heat from the cooling water used for cooling of the heat source to the outside and including areas including different temperatures may include checking internal/external conditions of the vehicle, spraying a first spray liquid to a first area having a first temperature of the different temperatures among the areas upon determining that an outside air temperature of the vehicle and a temperature of the cooling water satisfy a first condition based on a result of checking the internal/external conditions of the vehicle, the first condition being as follows: $TO \geq T1$ and $TC \geq T2$ (where $T0$ represents the outside air temperature, $T1$ represents a first predetermined outside air temperature, $TC$ represents the temperature of the cooling water, and $T2$ represents a first predetermined cooling temperature), and spraying a second spray liquid including a lower temperature than the first spray liquid to a second area including a second temperature, which is lower than the first temperature, among the areas upon determining that the outside air temperature of the vehicle and the temperature of the cooling water satisfy a second condition based on a result of checking the internal/external conditions of the vehicle, the second condition being as follows: $T4 \leq TO \leq T3$ and $T6 \leq TC \leq T5$ (where $T3$ represents a second predetermined outside air temperature, $T4$ represents a third predetermined outside air temperature, $T5$ represents a second predetermined cooling temperature, and $T6$ represents a third predetermined cooling temperature).

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
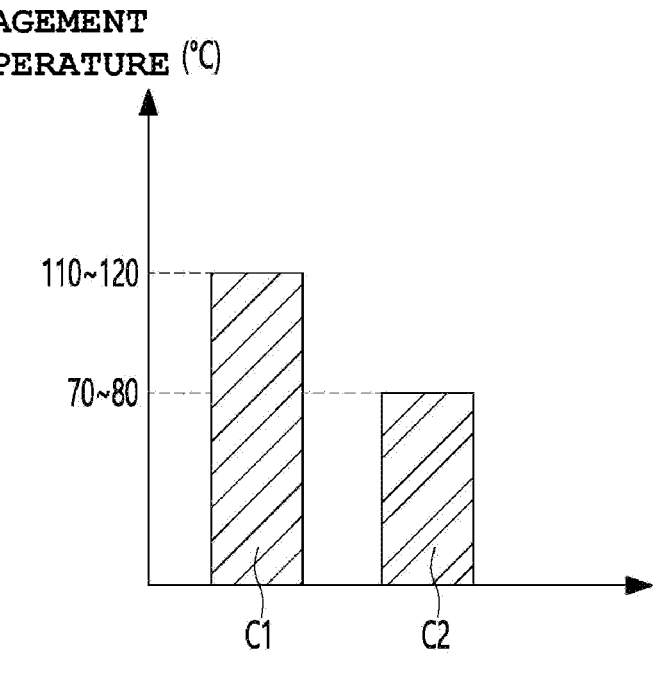
FIG. 1A is a graph showing comparison between management temperatures required by an internal combustion engine and a fuel cell.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure will now be described more fully hereinafter with reference to the accompanying drawings, in which various exemplary embodiments of the present disclosure are shown. The examples, however, may be embodied in various forms, and should not be construed as being limited to the exemplary embodiments set forth herein. Rather, these embodiments are provided so that the present disclosure will be more thorough and complete, and will more fully convey the scope of the present disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

Furthermore, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, fuel cell vehicles 100, 100A, and 100B (hereinafter referred to as "vehicles") according to various exemplary embodiments will be described with reference to the accompanying drawings. The fuel cell vehicles 100, 100A, and 100B will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the exemplary embodiments are not limited thereto. That is, the x-axis, the y-axis, and the z-axis may intersect each other obliquely.

Figure 2:
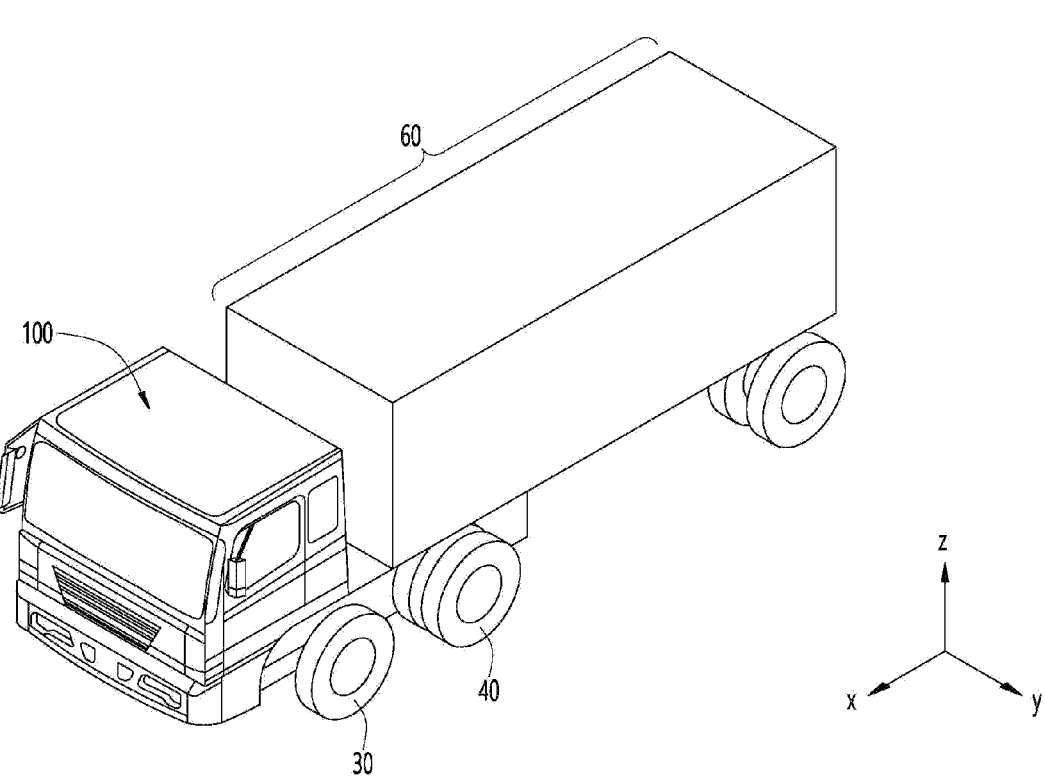
FIG. 2 is a perspective view showing the external appearance of a vehicle according to an exemplary embodiment of the present disclosure, to which a trailer is connected.
Figure 3:
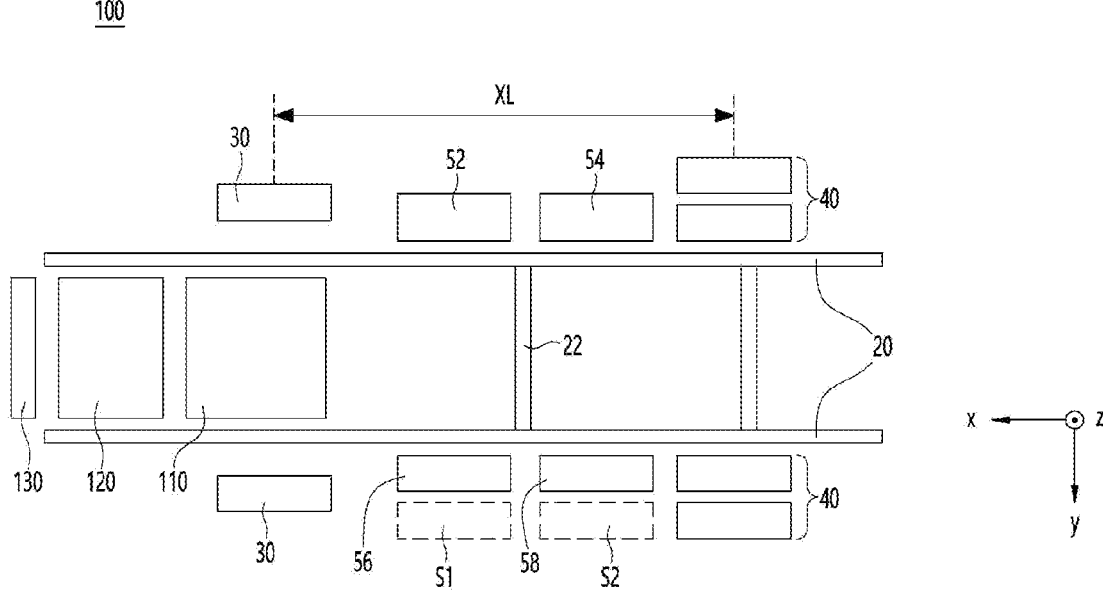
FIG. 3 is a plan view of the vehicle shown in FIG. 2.

FIG. 2 is a perspective view showing the external appearance of the vehicle 100 according to the exemplary embodiment of the present disclosure, to which a trailer 60 is connected, and FIG. 3 is a plan view of the vehicle 100 shown in FIG. 2.

The trailer 60 may be connected to the rear side of the vehicle 100 according to the exemplary embodiment of the present disclosure, but the exemplary embodiments are not limited to any specific type of vehicle 100.

The vehicle 100 may include two body frames 20, a cross member 22, front wheels 30, rear wheels 40, various parts, a heat source 110, a radiator 120, and a spray unit 130.

The body frames 20 are parts that define a framework of the vehicle 100 from the front side to the rear side of the vehicle 100. At least one cross member 22 may be disposed between the body frames 20. The two body frames 20 may extend in a traveling direction (or a heading direction) of the vehicle 100, and may be spaced from each other to face each other in a direction crossing the heading direction of the vehicle 100. In the instant case, the at least one cross member 22 is a part which is disposed (or located) between the body frames 20 spaced from each other. The at least one cross member 22 may be integrally formed with the body frames 20.

Various parts may be disposed in various spaces 52, 54, 56 and 58. For example, a low-voltage DC/DC converter (LDC), a bidirectional high-voltage DC/DC converter (BHDC), a high-voltage junction box, and a motor control unit (MCU) may be disposed in the space 52. A battery may be disposed in the space 54. An electric water pump (EWP) and an electro-hydraulic pump (EHP) may be disposed in the space 56. An air compressor may be disposed in the space 58. However, the exemplary embodiments are not limited to any specific disposition relationship between the various parts and the spaces 52, 54, 56 and 58.

The heat source 110 is a part from which heat is generated when the fuel cell vehicle is driven. The heat source 110 may include at least one of a fuel cell (or a fuel cell stack) or an electronic component. For instance, the heat source 110 is a fuel cell.

The fuel cell may be, for example, a polymer electrolyte membrane fuel cell (or a proton exchange membrane fuel cell) (PEMFC), which has been studied most extensively as a power source for driving vehicles. The fuel cell may include end plates, a current collector, and a cell stack. The cell stack may include a plurality of unit cells that are stacked one above another. Because the current collector and the end plates are well known in the art, a detailed description thereof will be omitted.

The electronic component may include at least one of a junction box (or a high-voltage junction box) or a power controller.

The junction box may be disposed above the fuel cell. The junction box is configured to distribute power generated in the cell stack of the fuel cell. For example, the junction box may include fuses and relays to control components of peripheral auxiliary devices (balance-of-plant (BOP)) assisting in the operation of the fuel cell.

The power controller is configured to boost the output voltage of the fuel cell. For example, the power controller may include a high-voltage boosting-type DC/DC converter (or a fuel cell DC/DC converter (FDC)).

The radiator 120 is configured to dissipate heat from cooling water that has received heat generated from the heat source 110 during a power generation process, i.e., cooling water that has cooled the heat source 110, to the atmosphere. The radiator 120 may correspond to a heat dissipator, a heat dissipating device, or a heat sink. The exemplary embodiments are not limited as to the type or the number of radiators 120 or the presence/absence or the type of a fan 180 to be described later.

According to the exemplary embodiment of the present disclosure, the spray unit 130 is configured to spray water to the radiator 120.

The following description will be provided on the assumption that the heat source 110 corresponds to a fuel cell. However, the following description may also be applied to a case in which the heat source 110 corresponds to an electronic component.

Figure 4:
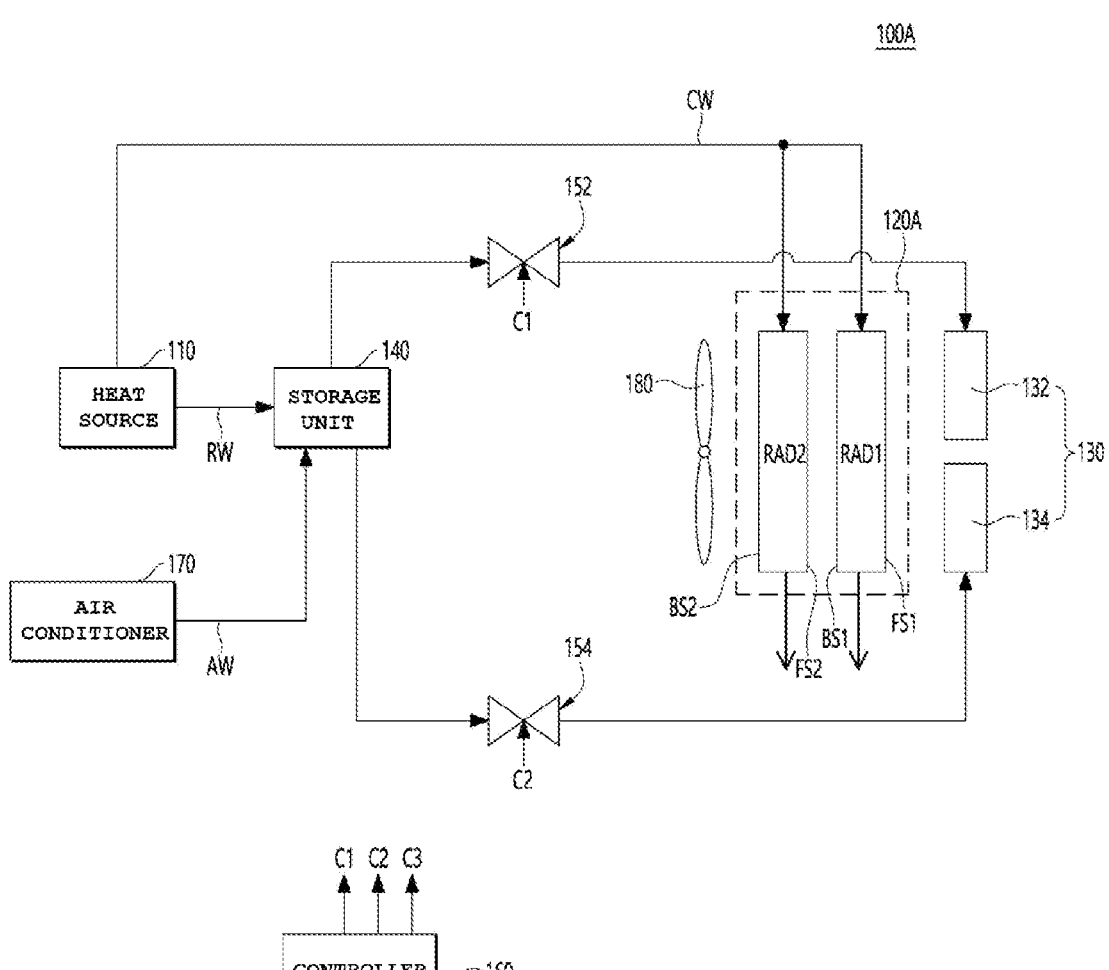
FIG. 4 is a block diagram of the fuel cell vehicle according to the embodiment.

FIG. 4 is a block diagram of a fuel cell vehicle 100A according to an exemplary embodiment of the present disclosure.

The vehicle 100A may include a fuel cell 110, a radiator 120A, a spray unit 130, a storage unit 140, first and second valves 152 and 154, and a controller 160. Furthermore, the vehicle 100A may further include an air conditioner 170. Furthermore, the vehicle 100A may further include a fan 180.

The vehicle 100A shown in FIG. 4 may correspond to an exemplary embodiment of the vehicle 100 shown in FIG. 2 and FIG. 3. Therefore, the fuel cell 110, the radiator 120A, and the spray unit 130 shown in FIG. 4 correspond to the fuel cell 110, the radiator 120, and the spray unit 130 shown in FIG. 3, respectively. Thus, the same components are denoted by the same reference numerals, and a duplicate description thereof will be omitted.

In FIG. 4, lines interconnecting the components 110, 120A, 130, 140, 152, 154, 160, and 170 may correspond to pipes through which liquid flows.

The fuel cell 110 may discharge cooling water CW that has absorbed heat generated during power generation, and may supply the discharged cooling water CW to the radiator 120A. If the heat source 110 is an electronic component, cooling water CW that has cooled the electronic component may be supplied to the radiator 120A.

The radiator 120A is configured to dissipate heat from the cooling water CW discharged from the fuel cell 110 to the outside.

For example, when the cooling water CW including a temperature of 75° C. to 80° C. flows into the radiator 120A and then the radiator 120A dissipates heat from the cooling water CW to the outside, the temperature of the cooling water CW may be lowered to 65° C. to 70° C., and the cooling water CW including a relatively low temperature may be discharged from the radiator 120A to return to the fuel cell 110.

The radiator 120A may include first and second radiators RAD1 and RAD2 disposed in series to be spaced from each other in the heading direction of the vehicle 100A (e.g., the x-axis direction).

The first radiator RAD1 may include a first front surface FS1, which faces first and second spray units 132 and 134 of the spray unit 130, and a first rear surface BS1, which is opposite to the first front surface FS1.

The second radiator RAD2 may include a second front surface FS2, which faces the first rear surface BS1 of the first radiator RAD1, and a second rear surface BS2, which is opposite to the second front surface FS2.

The fan 180 is disposed to face the second rear surface BS2 of the second radiator RAD2. The fan 180 is configured to control air flow to the radiator 120A and/or air flow from the radiator 120A.

Figure 5:
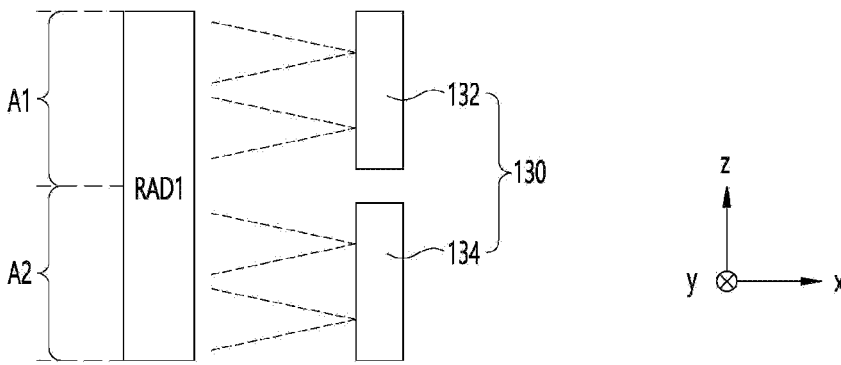
FIG. 5 is a side view of the first radiator and the first spray unit and the second spray unit shown in FIG. 4.

FIG. 5 is a side view of the first radiator RAD1 and the first spray unit and the second spray unit 132 and 134 shown in FIG. 4.

The radiator 120A, particularly the first radiator RAD1, may include areas including different temperatures. Hereinafter, among these areas, an area A1 including a higher temperature will be referred to as a "first area", and an area A2 including a lower temperature will be referred to as a "second area".

Figure 6:
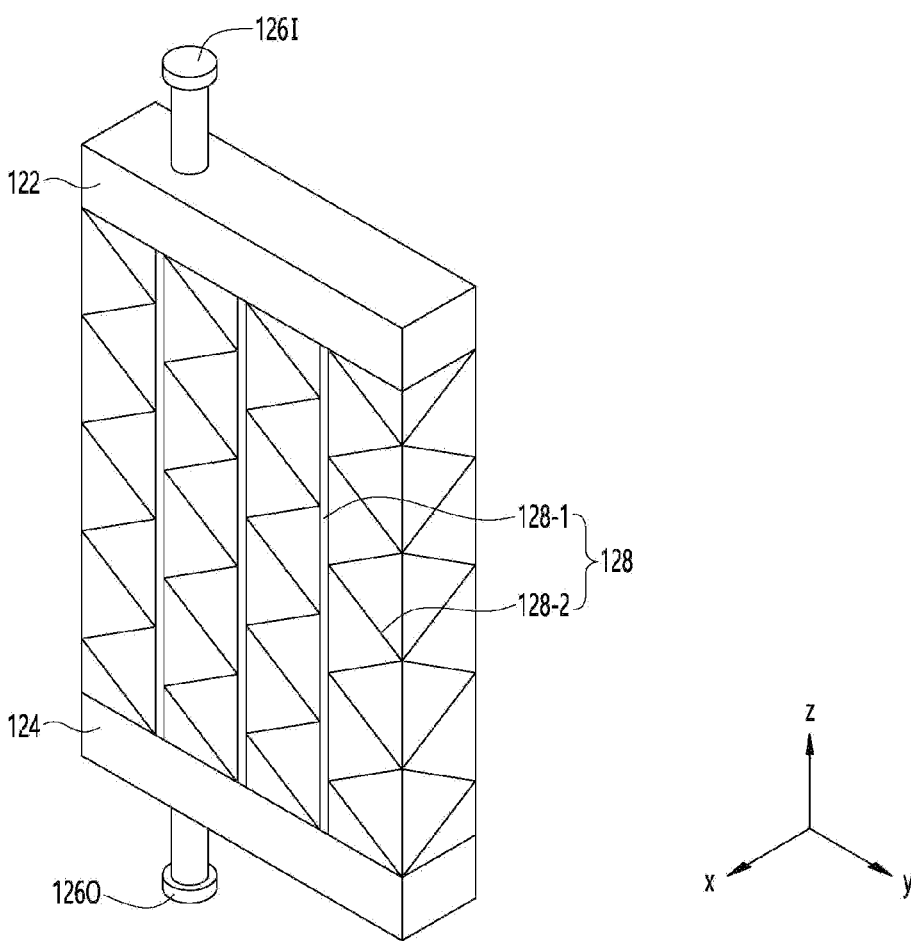
FIG. 6 is a perspective view showing an example of each of the first and second radiators shown in FIG. 4 and FIG. 5.

FIG. 6 is a perspective view showing an example of the radiator 120A (an example of each of the first and second radiators RAD1 and RAD2) shown in FIG. 4 and FIG. 5.

Each of the first and second radiators RAD1 and RAD2 shown in FIG. 4 and FIG. 5 may include a shape shown in FIG. 6, but the exemplary embodiments are not limited to any specific shape of each of the first and second radiators RAD1 and RAD2.

The radiator shown in FIG. 6 may include an inlet 1261, a core 128, and an outlet 1260. Furthermore, the radiator may further include tanks 122 and 124 configured to store cooling water therein.

The inlet 1261 is a portion into which the cooling water CW discharged from the fuel cell 110 is introduced. The core 128 is configured to dissipate heat from the cooling water CW introduced into the inlet 1261 to the outside thereof, and may include a tube 128-1 and a fin 128-2. The tube 128-1 has a vertical or horizontal structure allowing the cooling water CW to pass therethrough, and the fin 128-2 has the property of promoting heat exchange. The tube 128-1 and the fin 128-2 are welded to each other, forming the core 128. The core 128 is located between the tanks 122 and 124.

The outlet 1260 is a portion that discharges the cooling water, the heat of which has been dissipated through the core 128.

Among the areas of the radiator shown in FIG. 6, the first area A1, which is located closer to the inlet 1261 than to the outlet 1260, has a higher temperature than the second area A2, which is located closer to the outlet 1260 than to the inlet 1261. This is because the inlet 1261 is a portion into which water containing heat that needs to be dissipated through the radiator is introduced and the outlet 1260 is a portion from which water, the heat of which has been dissipated through the radiator, is discharged.

Therefore, in the case in which the first radiator RAD1 has the configuration shown in FIG. 6, as shown in FIG. 5, the upper area of the first radiator RAD1, which has a higher temperature than the lower area thereof, corresponds to the first area A1, and the lower area of the first radiator RAD1, which has a lower temperature than the upper area thereof, corresponds to the second area A2.

Referring again to FIG. 4, the spray unit 130 includes a first spray unit 132 and a second spray unit 134. The first spray unit 132 may spray a first spray liquid to the first area A1, and the second spray unit 134 may spray a second spray liquid, which includes a lower temperature than the first spray liquid, to the second area A2.

For example, product water RW generated as a by-product during reaction between hydrogen and oxygen for generation of power in the fuel cell 110 may be discharged to the storage unit 140 as the first spray liquid. The product water RW may have a temperature of 60° C. or lower, e.g., 57° C.

to 58° C., and may be discharged from the fuel cell 110 at a rate of 0.5 to 0.6 liter per minute (LPM). Furthermore, condensed water AW discharged from the air conditioner 170 may be stored in the storage unit 140 as the second spray liquid. For example, the condensed water AW may have a temperature of 20° C. to 25° C., and may be discharged from the air conditioner 170 at a rate of 0.5 LPM.

Figure 7:
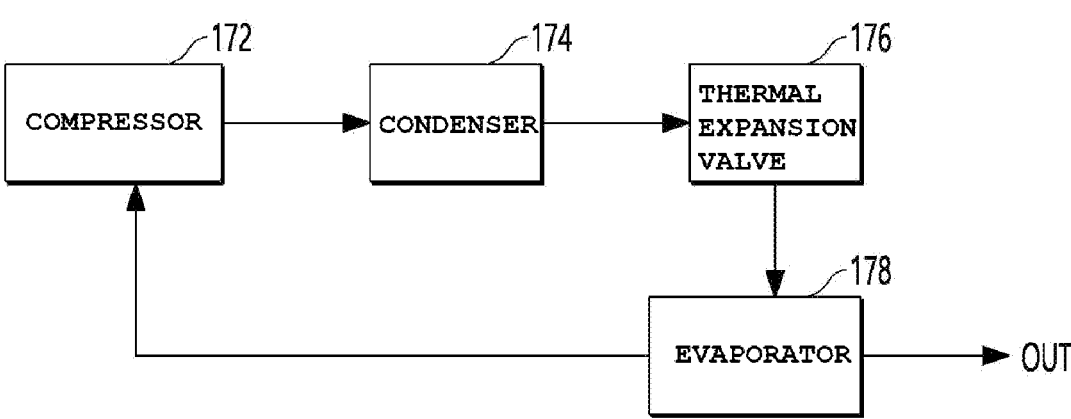
FIG. 7 is a block diagram of the air conditioner shown in FIG. 4.

FIG. 7 is a block diagram of the air conditioner 170 shown in FIG. 4.

The air conditioner 170 shown in FIG. 4 may be implemented as shown in FIG. 7, but the exemplary embodiments are not limited to any specific structure of the air conditioner 170.

The air conditioner 170A shown in FIG. 7 may include a compressor 172, a condenser 174, a thermal expansion valve 176, and an evaporator 178.

The compressor 172 is configured to increase the pressure of a refrigerant so that the refrigerant vapor evaporated in the evaporator 178 is easily condensed. That is, the compressor 172 is configured to compress the vapor.

The condenser 174 is configured to liquefy the refrigerant by driving a cooling fan to forcibly cool the high-temperature and high-pressure refrigerant gas introduced from the compressor 172.

The thermal expansion valve 176 includes a main body, a diaphragm, a ball valve, a spring, a temperature sensing chamber, and a pressure equalizing pipe. The temperature sensing chamber detects the temperature of the refrigerant passing through the outlet side of the evaporator, converts the detected temperature into pressure, and transfers the pressure to an upper portion of the diaphragm. The pressure equalizing pipe detects the pressure of the refrigerant, and transfers the detected pressure to the lower portion of the diaphragm. The degree of opening of the refrigerant flow path is adjusted using the equilibrium relationship between the pressure force and the spring force.

The evaporator 178 converts the low-temperature and low-pressure refrigerant in a wet saturated steam state, which is introduced thereinto after being subjected to expansion, into superheated steam through heat exchange with inside/outside air of the vehicle. For example, moisture removed from the humid air passing through the evaporator 178 may correspond to the second spray liquid which is discharged through an outlet port OUT in a form of the condensed water AW.

Furthermore, according to the exemplary embodiment of the present disclosure, the air conditioner 170 or 170A may be driven using surplus regenerative power generated when the fuel cell vehicle 100 is braked.

The storage unit 140 is configured to store the first spray liquid and the second spray liquid therein. That is, the storage unit 140 may store the product water RW output from the fuel cell 110 as the first spray liquid, and may store the condensed water AW output from the air conditioner 170 as the second spray liquid.

Figure 8A:
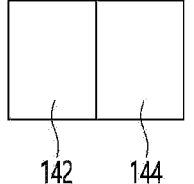
FIG. 8A and FIG. 8B show the configuration of embodiments of the storage unit shown in FIG. 4.
Figure 8B:
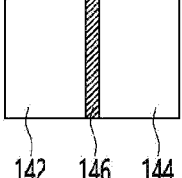

FIG. 8A and FIG. 8B show the configuration of embodiments 140A and 140B of the storage unit 140 shown in FIG. 4.

According to an exemplary embodiment of the present disclosure, as shown in FIG. 8A, the storage unit 140A may include a first storage chamber 142 and a second storage chamber 144.

The first storage chamber 142 is configured to store the product water RW therein, and the second storage chamber 144 is configured to store the condensed water AW therein.

According to another exemplary embodiment of the present disclosure, as shown in FIG. 8B, the storage unit 140B may further include a partition wall 146 in addition to the first and second storage chambers 142 and 144. The partition wall 146 is disposed between the first storage chamber 142 and the second storage chamber 144 to block heat exchange between the first storage chamber 142 and the second storage chamber 144. When the partition wall 146 is provided in the present way, the temperature of the product water RW stored in the first storage chamber 142 and the temperature of the condensed water AW stored in the second storage chamber 144 may be maintained. For example, air may be injected into the partition wall 146 to form a heat-insulating air layer.

Referring again to FIG. 4, the first valve 152 is opened or closed in response to a first control signal C1 to supply the first spray liquid stored in the storage unit 140 to the first spray unit 132, and the second valve 154 is opened or closed in response to a second control signal C2 to supply the second spray liquid stored in the storage unit 140 to the second spray unit 134.

The controller 160 may be configured to generate the first and second control signals C1 and C2 for control of the spray amount of the first spray liquid and the second spray liquid and operation of spraying the first spray liquid and the second spray liquid based on internal/external conditions of the vehicle 100 or 100A.

That is, the controller 160 may be configured to generate the first control signal C1 to control the amount of the first spray liquid to be sprayed from the first spray unit 132 or to control the first spray unit 132 not to spray the first spray liquid. Furthermore, the controller 160 may be configured to generate the second control signal C2 to control the amount of the second spray liquid to be sprayed from the second spray unit 134 or to control the second spray unit 134 not to spray the second spray liquid.

According to the exemplary embodiment of the present disclosure, the internal/external conditions of the vehicle 100 or 100A may include at least one of the outside air temperature of the vehicle 100 or 100A, the traveling speed of the vehicle 100 or 100A, the rotation speed of the fan 180, the rotation speed of a water pump for the fuel cell 110, the temperature of the cooling water CW discharged from the fuel cell 110, or the load level of the fuel cell 110. Here, the load level of the fuel cell 110 may be indirectly obtained using the temperature of the cooling water CW.

Figure 9:
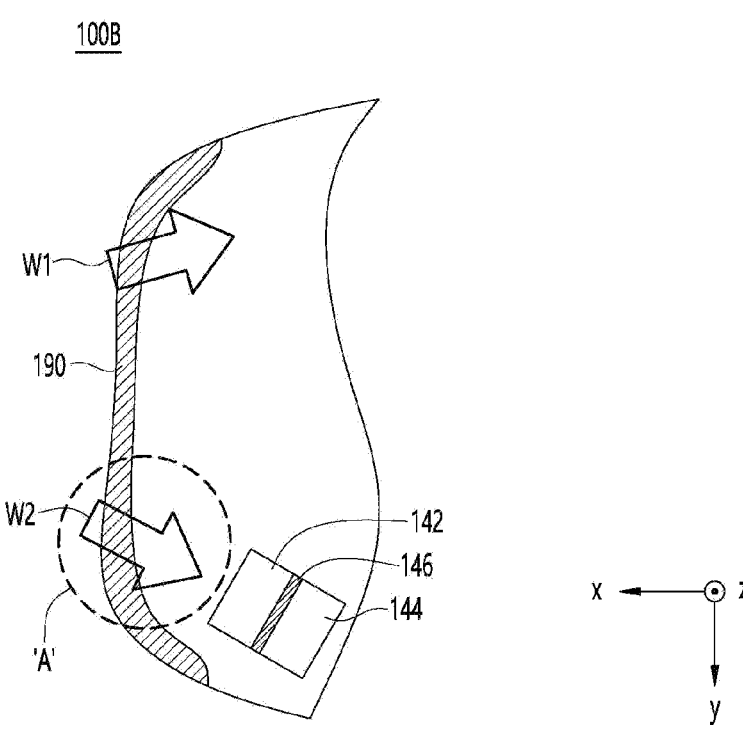
FIG. 9 is a plan view showing a portion of the front side of the vehicle according to the embodiment.

FIG. 9 is a plan view showing a portion of the front side of the vehicle 100B according to the embodiment.

The vehicle 100B shown in FIG. 9 may correspond to an exemplary embodiment of the vehicles 100 and 100A shown in FIG. 2, FIG. 3 and FIG. 4.

For example, when the vehicle 100B travels, outside air may flow into the vehicle 100B in the directions indicated by the arrows W1 and W2 shown in FIG. 9. In the instant case, according to the exemplary embodiment of the present disclosure, the vehicle 100B may further include an air opening/closing unit 190.

The air opening/closing unit 190 may be attached to the front surface of the vehicle 100B, and may be opened or closed in response to a third control signal C3 output from the controller 160 shown in FIG. 4 to allow or block introduction of the outside air into the vehicle 100B while the vehicle 100B is traveling.

The controller 160 may be configured to generate the third control signal C3 for control of allowance/blocking of introduction of the outside air and the introduction amount of the outside air based on the internal/external conditions of the vehicle 100B. That is, the controller 160 may be configured to generate the third control signal C3 to control the amount of the outside air introduced into the vehicle 100B through the air opening/closing unit 190 or to control the air opening/closing unit 190 to block introduction of the outside air while the vehicle 100B is traveling.

Although the air opening/closing unit 190 is illustrated in FIG. 9 as being disposed on the entire area of the front surface of the vehicle 100B, the exemplary embodiments are not limited thereto. That is, the air opening/closing unit 190 may be locally disposed only on a portion of the front surface of the vehicle 100B.

Figure 10A:
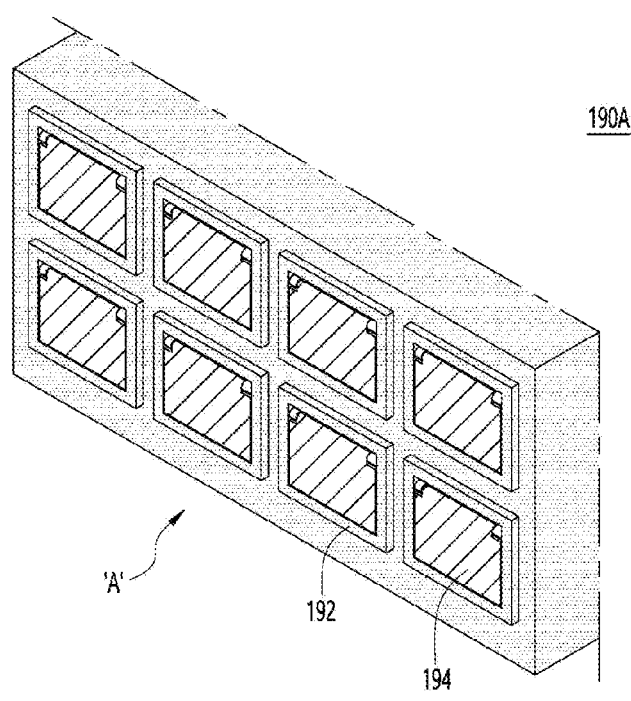
FIG. 10A and FIG. 10B are perspective views of an exemplary embodiment of an air opening/closing unit located in a portion indicated by "A" shown in FIG. 9.
Figure 10A:
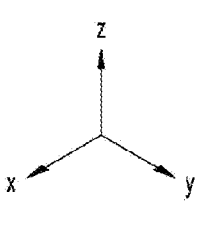
Figure 10B:
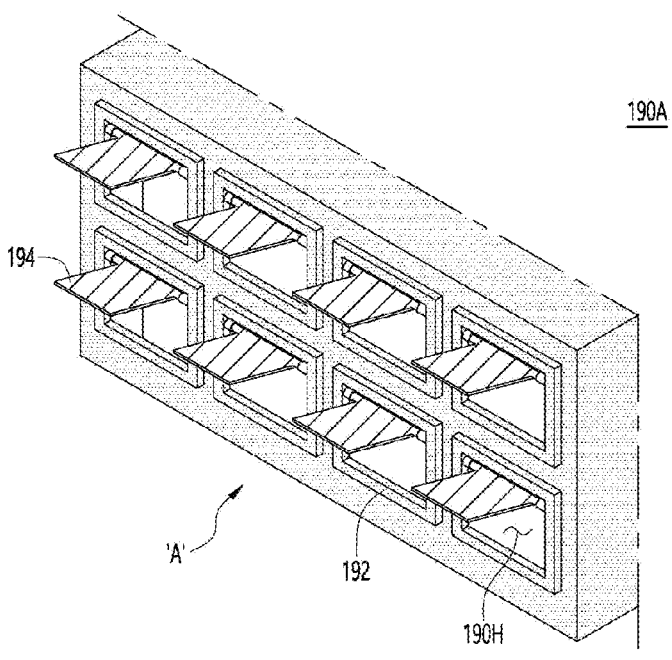
Figure 10B:
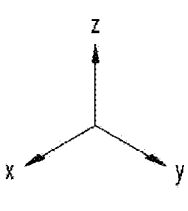

FIG. 10A and FIG. 10B are perspective views of an exemplary embodiment of the air opening/closing unit 190 located in a portion indicated by "A" shown in FIG. 9.

According to the exemplary embodiment of the present disclosure, the air opening/closing unit 190 may include a frame 192, which includes a plurality of cavities 190H, and a plurality of covers 194, which are rotated in response to the third control signal C3 to close or open the cavities 190H. Therefore, the number of covers 194 is equal to the number of cavities 190H.

In the instant case, according to the exemplary embodiment of the present disclosure, the first storage chamber 142 may be disposed adjacent to the air opening/closing unit 190 in each of flow paths indicated by the arrows W1 and W2, along which the outside air is introduced into the vehicle 100B. For example, as illustrated in FIG. 9, the first storage chamber 142 may be disposed adjacent to the air opening/closing unit 190 in the flow path indicated by the arrow W2, along which the outside air is introduced into the vehicle 100B.

When it is intended to cool the first storage chamber 142 storing the product water RW using the outside air during travel of the vehicle 100B, the controller 160 may be configured to generate the third control signal C3 to rotate the covers 194 to open the cavities 190H, as shown in FIG. 10B. Accordingly, the outside air may be introduced into the vehicle 100B through the cavities 190H to cool the first storage chamber 142. Alternatively, when it is not intended to cool the product water RW stored in the first storage chamber 142 using the outside air during travel of the vehicle 100B, the controller 160 may be configured to generate the third control signal C3 to rotate the covers 194 to close the cavities 190H, as shown in FIG. 10A, blocking introduction of the outside air into the vehicle 100B.

Figure 11:
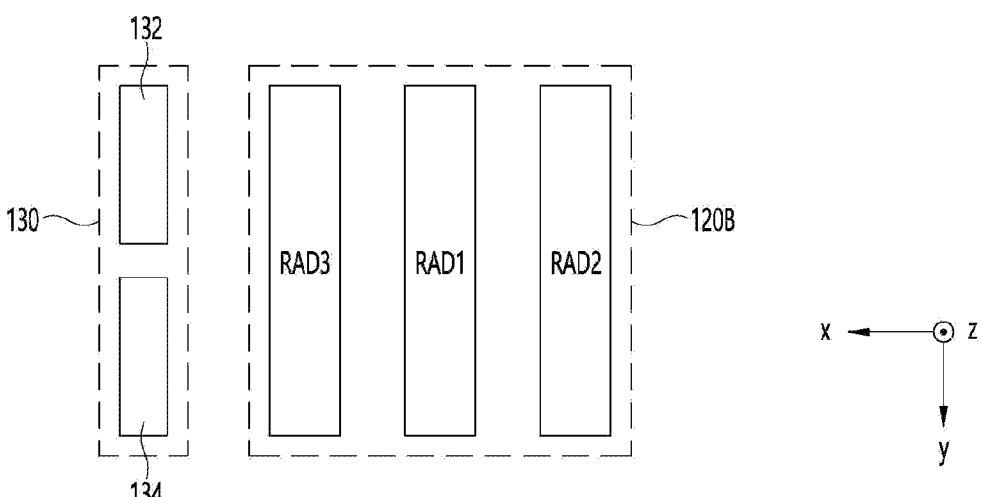
FIG. 11 is a plan view of a radiator according to another exemplary embodiment of the present disclosure.
Figure 12:
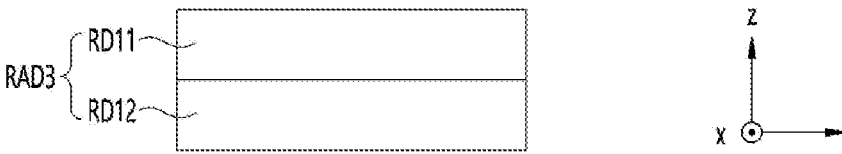
FIG. 12 is a front view of the radiator shown in FIG. 11.

FIG. 11 is a plan view of a radiator 120B according to another exemplary embodiment of the present disclosure, and FIG. 12 is a front view of the radiator 120B shown in FIG. 11.

The radiator 120A according to the exemplary embodiment shown in FIG. 4 includes only the first and second radiators RAD1 and RAD2, whereas the radiator 120B shown in FIG. 11 may include first, second, and third radiators RAD1, RAD2, and RAD3.

The first, second, and third radiators RAD1, RAD2, and RAD3 shown in FIGS. 4 and 11 may be connected to the heat source 110, i.e., at least one of the fuel cell or the electronic component.

The radiator 120B shown in FIG. 11 corresponds to another exemplary embodiment of the radiator 120 shown in FIG. 3.

Similar to the first and second radiators RAD1 and RAD2 of the radiator 120A shown in FIG. 4, the first, second, and third radiators RAD1, RAD2, and RAD3 may be disposed to be aligned with each other while being spaced from each other in the heading direction of the vehicle 100 (e.g., the x-axis direction).

The third radiator RAD3 may be disposed between the first spray unit and the second spray unit 132 and 134 and the first radiator RAD1. Furthermore, as shown in FIG. 12, the third radiator RAD3 may include a plurality of third radiators RD11 and RD12 stacked in a vertical direction.

In the configuration shown in FIG. 4, the spray unit 130 sprays at least one of the first spray liquid or the second spray liquid only to the first radiator RAD1, whereas in the configuration shown in FIG. 11 and FIG. 12, the spray unit 130 may spray at least one of the first spray liquid or the second spray liquid only to the third radiator RAD3.

In the configuration shown in FIGS. 4 and 11, the first and second radiators RAD1 and RAD2 is configured to cool the cooling water CW of the fuel cell 110. The third radiator RAD3 shown in FIG. 11 and FIG. 12 is configured to cool various parts disposed in the spaces 52, 54, 56 and 58 shown in FIG. 3.

For example, one (e.g., RD11) of the third radiators RAD3 (RD11 and RD12) may cool parts disposed in the space 58 shown in FIG. 3, and the other (e.g., RD12) may cool parts disposed in the spaces 52, 54, and 56 shown in FIG. 3. Alternatively, one (e.g., RD11) of the third radiators RAD3 (RD11 and RD12) may cool parts disposed in the spaces 52, 54, and 56 shown in FIG. 3, and the other (e.g., RD12) may cool parts disposed in the space 58 shown in FIG. 3.

According to the exemplary embodiment of the present disclosure, in the configuration shown in FIG. 4, because the spray liquid is sprayed to the first radiator RAD1, the temperature of air flowing to the second radiator RAD2 via the first radiator RAD1 may be lowered, and in the configuration shown in FIG. 11, because the spray liquid is sprayed to the third radiator RAD3, the temperature of air flowing to the first radiator RAD1 via the third radiator RAD3 may be lowered. For example, the temperature of air flowing to the second radiator RAD2 (or the first radiator RAD1 in the configuration shown in FIG. 11) may be lowered from 60° C. to 40° C. To the present end, as described above, the first, second, and third radiators RAD1 to RAD3 are disposed in series.

Hereinafter, a method 200 of cooling a fuel cell vehicle according to an exemplary embodiment will be described with reference to the accompanying drawings.

Figure 13:
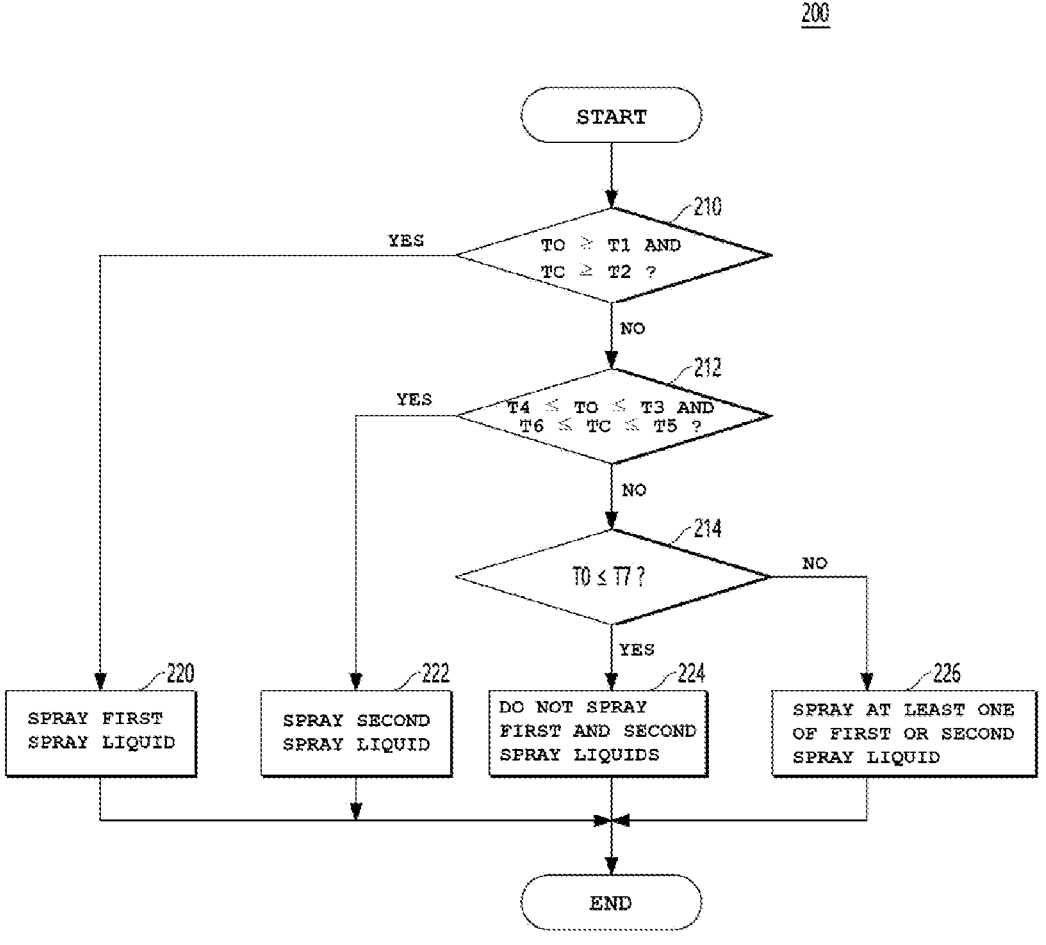
FIG. 13 is a flowchart for explaining a method of cooling a fuel cell vehicle according to an exemplary embodiment of the present disclosure.

FIG. 13 is a flowchart for explaining the method 200 of cooling a fuel cell vehicle according to an exemplary embodiment of the present disclosure.

Hereinafter, the method 200 shown in FIG. 13 will be described as being performed by the vehicle 100A shown in FIG. 4, and the vehicle 100A shown in FIG. 4 will be described as performing the method 200 shown in FIG. 13. However, the exemplary embodiments are not limited thereto. That is, the following description may also be applied to a case in which the vehicle 100A shown in FIG. 4 performs a method configured differently from the method 200 shown in FIG. 13, and the method 200 shown in FIG. 13 may also be applied to a vehicle configured differently from the vehicle 100A shown in FIG. 4.

First, the controller 160 may check internal/external conditions of the vehicle 100A.

According to the exemplary embodiment of the present disclosure, to check the internal/external conditions of the vehicle 100A, the controller 160 may check at least one of the outside air temperature of the vehicle 100A, the traveling speed of the vehicle 100A, the rotation speed of the fan 180, the rotation speed of a water pump for the fuel cell 110, the temperature of the cooling water CW discharged from the fuel cell 110, or the load level of the fuel cell 110.

Furthermore, the number of revolutions per minute (RPM) of the fan 180 may be adjusted to control the flow rate of air flowing to the radiator 120A, and the revolutions per minute (rpm) of the water pump for the fuel cell 110 may be adjusted to control the flow rate of water flowing through the radiator 120A.

For example, as shown in FIG. 13, to check the internal/external conditions of the vehicle 100A, the controller 160 may use the outside air temperature TO of the vehicle 100A and the temperature TC of the cooling water CW discharged from the fuel cell 110 (steps 210 to 214).

First, it is checked whether the outside air temperature TO of the vehicle 100A and the temperature TC of the cooling water CW satisfy Equation 1 below (step 210).

$$TO \geq T1 \text{ and } TC \geq T2 \qquad \text{[Equation 1]}$$

Here, T1 represents a first predetermined outside air temperature, which may be, for example, 35° C., and T2 represents a first predetermined cooling temperature, which may be, for example, 80° C.

In step 210, it is checked whether the outside air temperature TO is as high as 35° C. to 40° C., for instance in summer, and whether the temperature TC of the cooling water CW is as high as 80° C. due to high-load operation of the fuel cell 110.

When the internal/external conditions of the vehicle 100A satisfy Equation 1, the first spray liquid may be sprayed to the first area A1, which has a relatively high temperature among the areas of the radiator 120 (step 220).

In the present way, when the first spray liquid including a predetermined temperature is sprayed to the high-temperature first area A1, which has a relatively high temperature among the areas of the radiator 120, evaporation of the water may be maximized upon contact of the first spray liquid with the high-temperature tube 128-1 and the high-temperature fin 128-2.

When the internal/external conditions of the vehicle 100A do not satisfy Equation 1, it is checked whether the outside air temperature TO of the vehicle 100A and the temperature TC of the cooling water CW satisfy Equation 2 below (step 212).

$$T4 \leq TO \leq T3 \text{ and } T6 \leq TC \leq T5 \qquad \text{[Equation 2]}$$

Here, T3 represents a second predetermined outside air temperature, which may be, for example, 25° C. T4 represents a third predetermined outside air temperature, which may be, for example, 10° C. T5 represents a second predetermined cooling temperature, which may be, for example, 70° C. T6 represents a third predetermined cooling temperature, which may be, for example, 60° C.

Furthermore, T3 may be lower than T1, and T5 may be lower than T2.

In step 212, it is checked whether the outside air temperature TO falls within a range of 10° C. to 25° C., in in-between seasons, and whether the temperature TC of the cooling water CW falls within a range of 60° C. to 70° C. due to intermediate-load operation of the fuel cell 110.

When the internal/external conditions of the vehicle 100A satisfy Equation 2, the second spray liquid, which has a lower temperature than the first spray liquid, may be sprayed to the second area A2, which has a lower temperature than the first area A1 (step 222).

In the present way, when the second spray liquid including a low temperature is sprayed to the low-temperature second area A2, which has a relatively low temperature among the areas of the radiator 120, the convective heat transfer cooling effect at the tube 128-1 and the fin 128-2 may be maximized.

When the internal/external conditions of the vehicle 100A do not satisfy Equation 2, it is checked whether the outside air temperature TO satisfies Equation 3 below (step 214).

$$TO \leq T7 \qquad \text{[Equation 3]}$$

Here, T7 represents a fourth predetermined outside air temperature, which may be 0° C.

Alternatively, T7 may be lower than T4, and may be a temperature at which freezing may occur when the spray liquid is sprayed.

In step 214, it is checked whether the outside air temperature TO is equal to or lower than 0° C., for instance, in winter.

When the outside air temperature TO of the vehicle 100A satisfies Equation 3, the first spray liquid and the second spray liquid are not sprayed (step 224). This is configured to prevent malfunction of pumps attributable to freezing of the spray liquid when the spray liquid is sprayed in winter.

When the outside air temperature TO of the vehicle 100A does not satisfy Equation 3, at least one of the first spray liquid or the second spray liquid is sprayed (step 226). The amount of the first spray liquid sprayed in step 226 may be smaller than that in step 220, and the amount of the second spray liquid sprayed in step 226 may be smaller than that in step 222. That is, a larger amount of first spray liquid may be sprayed in step 220 than in step 226, and a larger amount of second spray liquid may be sprayed in step 222 than in step 226.

Steps 220 to 226 may be performed by the controller 160 controlling the first and second valves 152 and 154 located in the passages through which the first spray liquid and the second spray liquid are supplied to the first spray unit and the second spray unit 132 and 134.

FIG. 13 shows an example of spraying the injection liquids using only two of the above-described various internal/external conditions of the vehicle 100A. However, the exemplary embodiments are not limited thereto. The amount of at least one of the first spray liquid or the second spray liquid to be sprayed to the radiator 120 (120A or 120B) may be adjusted using other additional conditions among the above-described internal/external conditions of the vehicle 100A, whereby the cooling performance of the vehicle 100 (100A or 100B) may be maximized.

Furthermore, cooling may be effectively performed by controlling the opening and closing of the air opening/closing unit 190A according to the traveling speed of the vehicle. This will be described below in detail.

According to the cooling method of the exemplary embodiment of the present disclosure, when Equation 1 above is satisfied and the traveling speed of the vehicle 100B is low, the air opening/closing unit 190A may perform closing operation, as shown in FIG. 10A, to block introduction of outside air into the vehicle 100B during travel of the vehicle 100B.

On the other hand, according to the cooling method of the exemplary embodiment of the present disclosure, when Equation 2 above is satisfied and the traveling speed of the vehicle is high, the outside air is introduced into the vehicle 100B through the cavities 190H in the air opening/closing unit 190A during travel of the vehicle 100B, as shown in FIG. 10B, cooling the first storage chamber 142.

Hereinafter, a vehicle and a cooling method according to comparative examples and the vehicle and the cooling method according to the exemplary embodiments will be described.

Figure 1B:
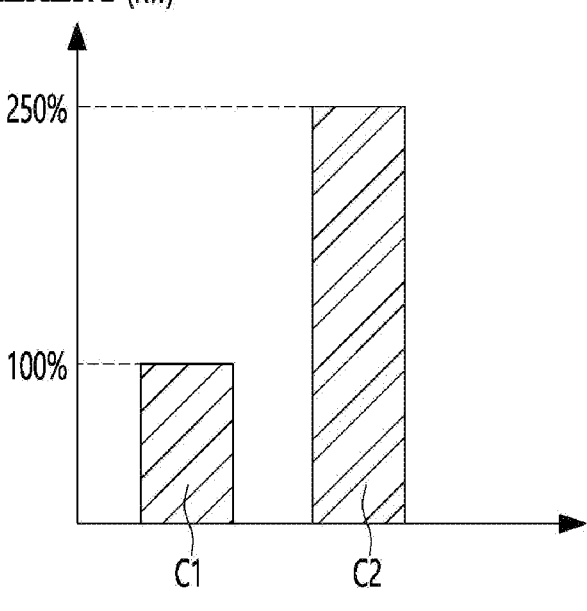
FIG. 1B is a graph showing comparison between cooling requirements of the internal combustion engine and the fuel cell.

In the case of the fuel cell vehicle according to the comparative example, water is not sprayed to the radiator. That is, the fuel cell vehicle according to the comparative example does not include the spray unit 130 among the components shown in FIG. 4. Therefore, in the case of the fuel cell vehicle according to the comparative example, the cooling performance of the radiator is poor. Therefore, radiators need to be disposed inside the side portions of the fuel cell vehicle to be adjacent to the spaces 52, 54, 56 and 58 shown in FIG. 3, in which various parts are disposed. For example, a radiator S1 is disposed inside the side portion of the vehicle to cool parts disposed in the spaces 52, 54, and 56, and a radiator S2 is disposed inside the side portion of the vehicle in order to cool parts disposed in the space 58. When the fuel cell vehicle according to the comparative example is configured so that the trailer 60 is connected thereto, as shown in FIG. 1, it is necessary to reduce a wheel base XL of the vehicle. However, in the case of the comparative example, because the radiators S1 and S2 are disposed inside the side portion of the vehicle, there is a limitation on the extent to which the wheel base is reduced. This makes it difficult to develop marketable vehicles. Furthermore, the structure in which the radiators are disposed inside the side portion of the vehicle may make piping of the cooling system complicated, and may increase the weight and manufacturing cost of the cooling system.

Furthermore, in the case of the comparative example, because the cooling performance of the radiators is not excellent, the performance of cooling the cell stack of the fuel cell is poor. Therefore, it is difficult to meet requirements for driving in hot areas in which the outside air temperature of the vehicle is 40° C. to 45° C., and thus the durability of the stack is rapidly degraded.

In contrast, in the case of the vehicle 100 according to the exemplary embodiment of the present disclosure, because the spray liquids including different temperatures are respectively sprayed to the areas including different temperatures, the amount and speed of dissipation of heat from the cooling water to the outside through the radiator 120 (120A or 120B) may be increased, leading to improvement of cooling performance (i.e., cooling efficiency). In the case in which the radiator 120A is disposed as shown in FIG. 4, when the spray liquids are sprayed, the heat dissipation performance of the first radiator RAD1 may be improved by about 50%, and the heat dissipation performance of the second radiator RAD2 may be improved by about 40% compared to when the spray liquids are not sprayed.

As described above, according to the exemplary embodiment of the present disclosure, the cooling performance of the radiator 120 (120A or 120B) may be improved. Therefore, the third radiator RAD3, which is configured as the radiators S1 and S2 according to the comparative example, may be integrated with the first and second radiators RAD1 and RAD2, and the integrated radiator assembly may be disposed inside the front side of the vehicle 100, as shown in FIG. 11. Accordingly, it is not necessary to dispose the radiators inside the side portion of the vehicle 100. Therefore, the exemplary embodiment of the present disclosure may enable reduction in the wheel base XL, and may thus be usefully applied to a type of vehicle to which the trailer 60 is connectable. Furthermore, according to the exemplary embodiment of the present disclosure, because the cooling performance of the radiator 120 (120A or 120B) is improved, the size of the radiator 120 (120A or 120B) may be reduced, and the size of the fan 180 may also be reduced, whereby the overall size of the cooling system may be reduced. As a result, a cost of manufacturing the cooling system may be reduced, the weight of the vehicle may be reduced, and packaging, the ease of assembly, and maintainability may be improved.

Recently, vehicles exhibiting excellent noise, vibration and harshness (NVH) characteristics have been developed. According to the exemplary embodiment of the present disclosure, because the cooling performance of the radiator 120 (120A or 120B) is improved, power consumed by the fan 180 may be reduced, and the revolutions per minute (rpm) of the fan 180 may be reduced. As a result, the noise, vibration, and harshness (NVH) characteristics and efficiency of use of electricity of the vehicle may be improved, and a range of the vehicle may be increased.

Furthermore, according to the exemplary embodiment of the present disclosure, in winter, the spray liquids are not sprayed, and the product water RW generated in the fuel cell 110 is stored in the storage unit 140 without being discharged to the outside of the vehicle. Therefore, it may be possible to prevent formation of ice on the road due to the product water RW discharged onto the road in winter, reducing the risk of traffic accidents. As a result, the marketability of the vehicle may be further improved.

Furthermore, when a regenerative braking condition of the vehicle is satisfied and when electricity generated in a situation in which the state of charge (SOC) value of the battery is not a fully charged state is consumed by a resistor, the resistor may be configured to generate heat. Therefore, a separate electric water pump (EWP) is required to cool the resistor, and the fan consumes power. In contrast, according to the exemplary embodiment of the present disclosure, when a regenerative braking condition of the vehicle is satisfied, the air conditioner 170 is forcibly driven using electricity generated in a situation in which the SOC value of the battery is not a fully charged state to generate the condensed water AW, whereby the above problems may be solved.

As is apparent from the above description, because the fuel cell vehicle according to the exemplary embodiment exhibits excellent cooling performance, the exemplary embodiment of the present disclosure may enable reduction in wheel base, and may thus be usefully applied to a type of vehicle to which a trailer is connectable. Furthermore, the size of a radiator may be reduced, and the size of a fan may also be reduced, whereby the overall size of a cooling system may be reduced. As a result, a cost of manufacturing the cooling system may be reduced, the weight of the vehicle may be reduced, and packaging, the ease of assembly, and maintainability may be improved. Furthermore, the marketability and efficiency of use of electricity of the vehicle may be improved, and a range of the vehicle may be increased. Furthermore, it may be possible to reduce the risk of traffic accidents, further improving the marketability of the vehicle. Furthermore, it is not necessary to include a separate electric water pump for cooling a resistor, which generates heat when a regenerative braking condition of the vehicle is satisfied and when electricity generated in a situation in which the SOC value of a battery is not a fully charged state is consumed by the resistor, and a fan does not consume power.

However, the effects achievable through the present disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

Furthermore, for any element or process which is not described in detail in any of the various exemplary embodiments of the present disclosure, reference may be made to the description of an element or a process having a same reference numeral in another exemplary embodiment of the present disclosure, unless otherwise specified.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel cell vehicle, comprising:

a heat source configured to discharge a cooling water used for generation of power;

a radiator fluidically connected to the heat source and configured to dissipate heat from the cooling water used for cooling of the heat source to an outside thereof, the radiator including areas including different temperatures;

a first spray unit configured to spray a first spray liquid to an area having a first temperature of the different temperatures among the areas;

a second spray unit configured to spray a second spray liquid to an area having a second temperature of the different temperatures, the second temperature being lower than the first temperature, among the areas, the second spray liquid including a lower temperature than the first spray liquid;

a storage unit fluidically connected to the first spray unit and the second spray unit and configured to store the first spray liquid and the second spray liquid therein;

a first valve connected to the storage unit and the first spray unit and configured to be opened or closed in response to a first control signal to supply the first spray liquid stored in the storage unit to the first spray unit;

a second valve connected to the storage unit and the second spray unit and configured to be opened or closed in response to a second control signal to supply the second spray liquid stored in the storage unit to the second spray unit; and a controller configured to generate the first control signal for control of a spray amount of the first spray liquid and operation of spraying the first spray liquid based on an internal condition or an external condition of the vehicle and to generate the second control signal for control of a spray amount of the second spray liquid and operation of spraying the second spray liquid based on the internal condition or the external condition.

2. The fuel cell vehicle of claim 1, further including:

an air conditioner connected to the storage unit and configured to discharge condensed water as the second spray liquid, the condensed water being moisture removed from humid air passing through an evaporator of the air conditioner, wherein product water as a by-product of generation of the power is used as the first spray liquid.

3. The fuel cell vehicle of claim 2, wherein the air conditioner is driven using surplus regenerative power generated when the fuel cell vehicle is braked.

4. The fuel cell vehicle of claim 2, wherein the radiator includes:

an inlet configured to receive the cooling water discharged from the heat source;

a core configured to dissipate the heat from the cooling water introduced into the inlet to an outside thereof; and an outlet configured to discharge the cooling water from which the heat has been dissipated through the core.

5. The fuel cell vehicle of claim 4, wherein, among the areas, an area located closer to the inlet than to the outlet includes a higher temperature than an area located closer to the outlet than to the inlet.

6. The fuel cell vehicle of claim 2, wherein the storage unit includes:

a first storage chamber configured to store the product water therein;

a second storage chamber configured to store the condensed water therein; and a partition wall disposed between the first storage chamber and the second storage chamber to block heat exchange between the first storage chamber and the second storage chamber.

7. The fuel cell vehicle of claim 6, further including:

an air opening/closing unit attached to a front surface of the vehicle, the air opening/closing unit being configured to be opened or closed in response to a third control signal to allow or block introduction of outside air into the vehicle during travel of the vehicle, wherein the first storage chamber is disposed in an introduction passage of the outside air to be adjacent to the air opening/closing unit, and wherein the controller is configured to generate the third control signal for control of allowance/blocking of introduction of the outside air and an introduction amount of the outside air based on the internal condition or the external condition of the vehicle.

8. The fuel cell vehicle of claim 2, wherein the radiator includes:

a first radiator including a front surface facing the first spray unit and the second spray unit; and a second radiator including a front surface facing a rear surface of the first radiator, the rear surface being opposite to the front surface of the first radiator.

9. The fuel cell vehicle of claim 8, wherein the radiator further includes:

a fan facing a rear surface of the second radiator, the rear surface of the second radiator being opposite to the front surface of the second radiator.

10. The fuel cell vehicle of claim 9, wherein the internal condition or the external condition of the vehicle include at least one of an outside air temperature of the fuel cell vehicle, a traveling speed of the fuel cell vehicle, a rotation speed of the fan, a rotation speed of a water pump for the heat source, a temperature of the cooling water discharged from the heat source, or a load level of the heat source.

11. The fuel cell vehicle of claim 8, wherein the radiator further includes two third radiators disposed between the first spray unit and the second spray unit and the first radiator, the two third radiators being stacked one above another in a vertical direction, and wherein the first spray unit and the second spray unit spray at least one of the first spray liquid or the second spray liquid to the two third radiators.

12. The fuel cell vehicle of claim 11, wherein the first radiator, the second radiator, and the two third radiators are disposed to be aligned with each other while being spaced from each other in a heading direction of the fuel cell vehicle.

13. The fuel cell vehicle of claim 1, wherein the controller is further configured for:

checking the internal condition or the external condition of the vehicle; and generating the first control signal for spraying the first spray liquid to the area having the first temperature of the different temperatures among the areas when the controller concludes that an outside air temperature of the vehicle and a temperature of the cooling water satisfy a first condition based on a result of checking the internal condition or the external condition of the vehicle, wherein the first condition is as follows:

$$TO \geq T1 \text{ and } TC \geq T2$$

where T0 represents the outside air temperature, T1 represents a first predetermined outside air temperature, TC represents the temperature of the cooling water, and T2 represents a first predetermined cooling temperature.

14. The fuel cell vehicle of claim 1, wherein the controller is further configured for:

checking the internal condition or the external condition of the vehicle; and spraying the second spray liquid including a lower temperature than the first spray liquid to the area including the second temperature, which is lower than the first temperature, among the areas when the controller concludes that an outside air temperature of the vehicle and a temperature of the cooling water satisfy a second condition based on a result of checking the internal condition or the external condition of the vehicle, and wherein the second condition is as follows:

$$T4 \leq TO \leq T3 \text{ and } T6 \leq TC \leq T5$$

where T3 represents a second predetermined outside air temperature, T4 represents a third predetermined outside air temperature, T5 represents a second predetermined cooling temperature, and T6 represents a third predetermined cooling temperature.

15. The fuel cell vehicle of claim 1, wherein the controller is further configured for spraying at least one of the first spray liquid or the second spray liquid, when an outside air temperature is equal to or lower than a predetermined temperature.

16. The fuel cell vehicle of claim 1, wherein the internal condition or the external condition includes at least one of an outside air temperature of the vehicle, a traveling speed of the vehicle, a temperature of the cooling water discharged from the heat source, or a load level of the heat source.

17. A method of cooling a fuel cell vehicle including a heat source configured to discharge a cooling water used for generation of power and a radiator fluidically connected to the heat source and configured to dissipate heat from the cooling water used for cooling of the heat source to an outside thereof, the radiator including areas including different temperatures, the method comprising:

checking, by a controller, an internal condition or an external condition of the vehicle;

spraying, by the controller, a first spray liquid to a first area having a first temperature of the different temperatures among the areas when the controller concludes that an outside air temperature of the vehicle and a temperature of the cooling water satisfy a first condition based on a result of checking the internal condition or the external condition of the vehicle, wherein the first condition is as follows:

$$TO \geq T1 \text{ and } TC \geq T2$$

where T0 represents the outside air temperature, T1 represents a first predetermined outside air temperature, TC represents the temperature of the cooling water, and T2 represents a first predetermined cooling temperature; and spraying, by the controller, a second spray liquid including a lower temperature than the first spray liquid to a second area including a second temperature, which is lower than the first temperature, among the areas when the controller concludes that the outside air temperature of the vehicle and the temperature of the cooling water satisfy a second condition based on a result of checking the internal condition or the external condition of the vehicle, and wherein the second condition is as follows:

$$T4 \leq TO \leq T3 \text{ and } T6 \leq TC \leq T5$$

where T3 represents a second predetermined outside air temperature, T4 represents a third predetermined outside air temperature, T5 represents a second predetermined cooling temperature, and T6 represents a third predetermined cooling temperature.

18. The method of claim 17, wherein the internal condition or the external condition includes at least one of the outside air temperature of the vehicle, a traveling speed of the vehicle, a temperature of the cooling water discharged from the heat source, or a load level of the heat source.

19. The method of claim 17, wherein the controller includes:

a processor configured for executing a program for performing the method of claim 17; and a non-transitory storage medium configured for recording the program of performing the method of claim 17.

* * * * *